United States Patent [19]

Tada et al.

[11] Patent Number: 4,996,339

[45] Date of Patent: Feb. 26, 1991

[54] TONER FOR DEVELOPING ELECTROSTATIC LATENT IMAGES

[75] Inventors: Akihiro Tada, Osaka; Takashi Kiriu, Kyoto; Motoomi Arakawa, Osaka, all of Japan

[73] Assignee: Orient Chemical Industries, Ltd., Osaka, Japan

[21] Appl. No.: 362,068

[22] Filed: Jun. 6, 1989

Related U.S. Application Data

[62] Division of Ser. No. 206,472, Jun. 13, 1988, Pat. No. 4,855,208.

[30] Foreign Application Priority Data

Jul. 9, 1987 [JP] Japan ................................ 62-172573

[51] Int. Cl.[5] ................................................ C07F 5/06

[52] U.S. Cl. ................................................ 556/181

[58] Field of Search ........................ 556/181, 170, 183; 430/110, 903

[56] References Cited

U.S. PATENT DOCUMENTS 4,434,178 2/1984 Hostettler et al. .............. 556/181 X 4,611,072 9/1986 Nachbur et al. ................ 556/181 X 4,673,631 6/1987 Fukumoto et al. ................... 430/10

FOREIGN PATENT DOCUMENTS 61-162055 7/1986 Japan .................................. 430/110

61-172156 8/1986 Japan .................................. 430/110

*Primary Examiner*—Arthur C. Prescott

*Attorney, Agent, or Firm*—McGlew and Tuttle

[57] ABSTRACT

A compound for developing electrostatic latent images for use in a toner wherein the compound comprises an aluminum compound of aromatic o-aminocarboxylic acid, the aromatic o-aminocarboxylic acid being represented by the formula

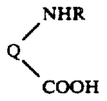

[1]

wherein Q is benzene nucleus which is optionally substituted with at least one nuclear substituent or naphthalene nucleus which is optionally substituted with at least one nuclear substituent, R is hydrogen, alkyl ($C_1$–$C_{18}$), aryl($C_1$–$C_{18}$), aralkyl($C_1$–$C_{18}$), or —COR', wherein R' is alkyl($C_1$–$C_8$), aryl($C_1$–$C_8$), alkoxy ($C_1$–$C_8$) or amino.

18 Claims, No Drawings

TONER FOR DEVELOPING ELECTROSTATIC LATENT IMAGES

This is a divisional application of application Ser. No. 206,472, filed June 13, 1988, now U.S. Pat. No. 4,855,208.

FIELD AND BACKGROUND OF THE INVENTION

The present invention relates to a novel negatively chargeable dry toner for developing electrostatic latent images for use in electrophotography, electrostatic recording, electrostatic printing, etc.

Electrostatic latent images can be developed into visible images with a toner deposited thereon by electrostatic attraction. Powder developers as well as liquid developers are widely used for developing electrostatic latent images.

Powder developers can be divided generally into two-component developers and single-component developers. The two-component developer comprises a finely divided toner having a mean particle size of 15 μm and prepared by dispersing a coloring agent, charge control agent, fluidizing agent and the like in a natural or synthetic resin, and a carrier of finely divided iron, ferrite or the like admixed with the toner and 100 to 200 μm in particle size. The latter single-component developer comprises only a finely divided toner having a mean particle size of 15 μm and prepared by dispersing a coloring agent, charge control agent, fluidizing agent, magnetic material and the like in a natural or synthetic resin.

Electrostatic latent images are developed with the two-component developer by triboelectrically charging the toner with the carrier and depositing the toner on the latent image. Toners heretofore known and serving as single-component developers include those which are triboelectrically chargeable by a brushlike or platelike friction member used in place of the carrier and having the same function s the carrier. Further provided in recent years are toners which are triboelectrically chargeable by a finely divided magnetic material which is maintained in a dispersed state. These developing toners are charged positively or negatively in accordance with the polarity of the electrostatic latent image to be developed.

To enable the toner to retain the charge, it is also proposed to utilize the triboelectric chargeability of the resin used as the main component of the toner, but the toner so adapted is low in chargeability and has a great solid surface resistance value. Consequently the toner image obtained is prone to fogging and obscure. To impart the desired chargeability to toners, it is practice to add to the toner a charge imparting dye or pigment, and a charge control agent. Presently used in the art are oil-soluble nigrosine dyes for imparting a positive charge to the toner as disclosed in Examined Japanese Patent Publication SHO No. 41-2427, etc., and metal-containing complex salt dyes for giving a negative charge as disclosed in Examined Japanese Patent Publications SHO No. 41-20153, SHO No. 43-17955 and SHO No. 45-26478, etc.

However, such dyes or pigments serving as charge control agents are complex in structure and low in stability. For example, they are liable to decompose or degrade, failing to exhibit charge control ability when subjected to mechanical friction and impact, to changes in temperature or humidity or to electric impact, or when exposed to light. Furthermore, they have a substantial defect in that being colored substances, they fail to fulfill the requirement that the charge control agent should be colorless or substantially colorless when to be used for a toner of particular color.

Recently, various charge control agents have been disclosed which meet this requirement. Among these, the compounds disclosed in Examined Japanese Patent Publications SHO No. 55-42452, SHO No. 58-41508, SHO No. 59-7348 and SHO No. 59-26944 contain chromium, cobalt or like heavy metal, while those disclosed in Unexamined Japanese Patent Publications SHO No. 61-69073 and SHO No. 61-73963 contain zinc. These compounds therefore leave the problem to be solved of providing a charge control agent free from heavy metal.

SUMMARY OF THE INVENTION

In view of the foregoing drawbacks of conventional charge control agents, the main object of the present invention is to provide a toner for developing electrostatic latent images having incorporated therein a compound which is useful as a charge control agent for giving a negative charge to the toner, satisfactorily dispersible in the resin component of the toner, highly amenable to pulverization, resistant to the ambient conditions, free from heavy metal or the like and therefore usable with high safety and which can be regarded as almost colorless.

To fulfill the above object, the present invention provides a toner for developing electrostatic latent images which is characterized in that the toner comprises an aluminum compound of aromatic o-aminocarboxylic acid, the aromatic o-aminocarboxylic acid being represented by the formula

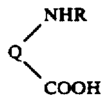

[I]

wherein Q is benzene nucleus which is optionally substituted with at least one nuclear substituent or naphthalene nucleus which is optionally substituted with at least one nuclear substituent, R is hydrogen, alkyl ($C_1$–$C_{18}$), aryl($C_1$–$C_{18}$), aralkyl($C_1$–$C_{18}$), or —COR′, wherein R′ is alkyl($C_1$–$C_8$), aryl($C_1$–$C_8$), alkoxy ($C_1$–$C_8$) or amino.

The toner of the present invention is triboelectrically chargeable uniformly with good stability and is outstanding in resistance to ambient conditions (resistance to moisture). During use, the toner remains free of degradation that could lead to variations or reduction in the amount of triboelectric charge and therefore has very high stability. Accordingly, the toner is usable without fogging, staining due to spillage and like objections. Whereas conventional toners have the serious problems of agglomeration, blocking and low-temperature flow during storage, the present toner can be stored for a prolonged period of time free of these problems to give sharp toner images which are excellent in abrasion resistance and amenability to fixing and adhesion.

Since the charge control agent is less likely to cause color disturbance, the present toner is usable for color electrophotography to produce copy images of excellent color.

DESCRIPTION OF THE PREFERRED EMBODIMENTS

The aluminum compound of aromatic o-aminocarboxylic acid for use in the present invention is prepared from an aromatic o-aminocarboxylic acid represented by above formula [I ], by treating the acid with an aluminum imparting agent by a known method. The aluminum compound is obtained, for example, by dissolving an anthranilic acid in water with addition of a sufficient amount of an alkali, adding to aluminum imparting agent, such as aluminum chloride or aluminum sulfate, to the solution, heating the mixture and adjusting the pH to 3 to 4 for reaction. The resulting precipitate is filtered off, thoroughly washed with water and dried, whereby the desired compound can be obtained. When required, the reaction can be carried out in an organic solvent.

When the aromatic o-aminocarboxylic acid and aluminum are 3:1 in mole ratio, the product will be represented by the following formula [II] or the formula [III].

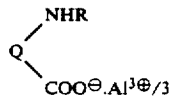

[II]

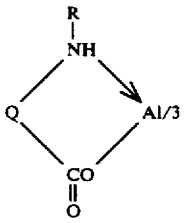

[III]

wherein Q is benzene nucleus which is optionally substituted with at least one nuclear substituent or naphthalene nucleus which is optionally substituted with at least one nuclear substituent, R is hydrogen, alkyl ($C_1$–$C_{18}$), aryl($C_1$–$C_{18}$), aralkyl($C_1$–$C_{18}$), or —COR', wherein R' is alkyl($C_1$–$C_8$), aryl($C_1$–$C_8$), alkoxy ($C_1$–$C_8$) or amino.

Examples of aromatic o-aminocarboxylic acids represented by the formula [I ] for use in this invention are anthranilic acid, 5-methylanthranilic acid, 4-t-butylanthranilic acid, 5-ethoxyanthranilic acid, 6-acetaminoanthranilic acid, 4-chloroanthranilic acid, 3,5-dichloroanthranilic acid, N-methylanthranilic acid, N-acetylanthranilic acid, N-phenylanthranilic acid, N-benzylanthranilic acid, N-carbomethoxyanthranilic acid, N-benzoyl-5-bromoanthranilic acid, 4-chloro-2-anilinobenzoic acid, 2-ureidobenzoic acid, 3-amino-2-naphthoic acid, 4,4'diaminodiphenyl-3-carboxylic acid, 2',3'-dimethyldiphenylamine-carboxylic acid, 2',5'-dichlorodiphenylamine-carboxylic acid, etc.

To prepare the toner of the present invention, the aluminum compound of aromatic o-aminocarboxylic acid represented by the formula [I ] is admixed with at least one of known resins for use in toners, such as styrene resin, styrene-acrylic resin, styrene-butadiene resin, epoxy resin, polyester resin and paraffin wax. The resin to be used is selected suitably in view of the adhesion, storage stability and flowability of the toner, the amenability of the toner composition to pulverization, etc.

The aluminum compound of aromatic o-aminocarboxylic acid represented by the formula [I ] is incorporated into the toner in an amount of 0.1 to 10 parts by weight, preferably 0.5 to 5 parts by weight, per 100 parts by weight of the resin component of the toner. If the amount of the aluminum compound is less than 0.1 part by weight, the advantage of the invention will not be fully available, whereas when it is more than 5 parts by weight, background smudging or fogging is likely to result.

The toner of the present invention may have incorporated therein other additives including, for example, lubricants such as PTFE and zinc stearate, flowability imparting agents such as coloidal silica, titanium oxide and aluminum oxide, anticaking agent, electrical conductivity imparting agents such as carbon black and tin oxide, and auxiliary fixing agents such as low-molecular-weight polyethylene.

While a wide variety of known dyes and pigments are usable as coloring agents, those especially suited for use in toners for color copies are carbon black, nigrosine dyes, Aniline Black, Benzidine Yellow, Hansa Yellow, chrome yellow, Rhodamine 6G Lake, quinacridone, Rose Bengale, phthalocyanine dyes or pigments including Phthalocyanine Blue B and Phthalocyanine Green, ultramarine, anthraquinone dyes, various dyes soluble in organic solvents, etc.

Although the toner of the invention is usually admixed with a carrier to provide a two-component developer, the toner is of course usable as a single-component developer.

The present invention will be described below in greater detail with reference to specific preparation examples and examples, in which the parts are all by weight.

PREPARATION EXAMPLE 1

Preparation of aluminum compound of N-methylanthranilic acid (N-methylanthranilic acid and aluminum are 3:1 in mole ratio)

A 45.3 g (0.3 mole) quantity of N-methylanthranilic acid was added to a solution of 12 g (0.3 mole) of NaOH in 500 mol of water, and the mixture was heated to about 60° C. to completely dissolve the acid. An aqueous solution of 17.1 g (0.05 mole) of aluminum sulfate in 200 ml of water was slowly added dropwise to the acid solution. The mixture was thereafter stirred at about 90° C. for 30 minutes, then cooled to about 40° C. The cooled reaction mixture was filtered, and the resulting product was washed with water until the pH of the washings was adjusted to neutrality. The washed product was dried at 90° C., giving about 47 g of a white powder (compound example (1) given below).

PREPARATION EXAMPLE 2

Preparation of aluminum compound of 5-methylanthranilic acid (5-methylanthranilic acid and aluminum are 3:1 in mole ratio)

A 45.3 g (0.3 mole) quantity of 5-methylanthranilic acid was added to a 500 ml of DMF, and the acid was completely dissolved. A solution of 17.1 g (0.05 mole) of aluminum sulfate in 150 ml of DMF was slowly added dropwise to the acid solution. The mixture was thereafter stirred at about 130° C. for an hour, then cooled to about 40° C. The cooled reaction mixture was filtered, and the resulting product was washed with water until the pH of the washings was adjusted to neutrality. The washed product was dried at 90° C., giving about 43 g of a white powder (compound example (2) given below).

PREPARATION EXAMPLE 3

Preparation of aluminum compound of 2',3'-dimethyldiphenylamine-carboxylic acid (2',3'-dimethyldiphenylamine-carboxylic acid and aluminum are 3:1 in mole ratio)

A 72.3 g (0.3 mole) quantity of 2',3'-dimethyldiphenylamine-carboxylic acid was added to a solution of 12 g (0.3 mole) of NaOH in 500 ml of water, and the mixture was heated to about 60° C. to completely dissolve the acid. An aqueous solution of 13.3 g (0.1 mole) of aluminum chloride in 200 ml of water was slowly added dropwise to the acid solution. The mixture was thereafter stirred at about 90° C. for 30 minutes, then cooled to about 40° C. The cooled reaction mixture was filtered, and the resulting product was washed with water until the pH of the washings was adjusted to neutrality. The washed product was dried at 90° C., giving about 73 g of a white powder (compound example (3) given below).

Specific examples of the aluminum compound of aromatic o-aminocarboxylic acid represented by the formula [I ] are given below. However the compound will be represented by the above formula [II ] or [III ], namely, salt form i.e., with a counterion, or complex form, the specific examples are shown as complexes for convenience.

| Compound Example | No. |
|---|---|
| 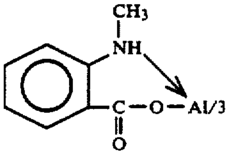 | (1) |
| 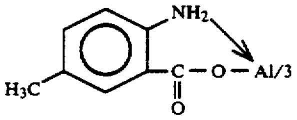 | (2) |
| 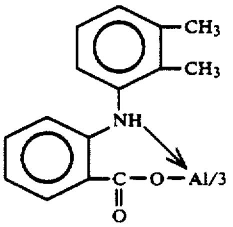 | (3) |
| 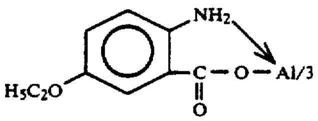 | (4) |
| 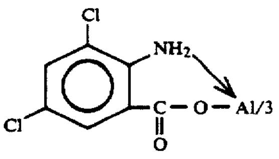 | (5) |

-continued

| Compound Example | No. |
|---|---|
| 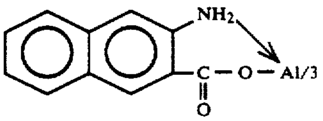 | (6) |
| 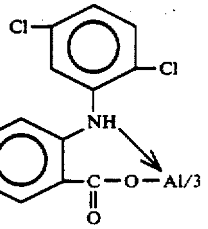 | (7) |
| 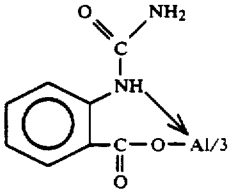 | (8) |
| 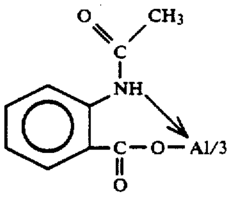 | (9) |
| 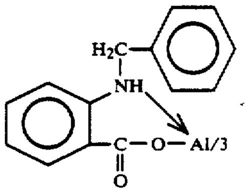 | (10) |
| 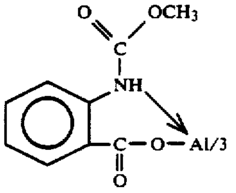 | (11) |

EXAMPLE 1

| | |
|---|---|
| Polyester resin (product of Nippon Synthetic Chemical Co., Ltd.) | 100 parts |
| Carbon black (product of Mitsubishi Chemicals, Ltd.) | 7 parts |
| Compound Example (1) | 1 part |

The above ingredients were premixed uniformly by a high-speed mixer. The premix was then kneaded in a molten state by an extruder, cooled and thereafter roughly divided by a vibrating mill. The resulting mixture was pulverized by an air jet mill equipped with a classifier, giving a black toner 10 to 20 $\mu m$ in particle size.

A developer was prepared by admixing 95 parts of a particulate iron carrier (TEFV 200/300, product of Nippon Teppun Co., Ltd.) with 5 parts of the toner. The developer was −27.3 μC/g in the amount of initial blowoff charges. The amounts of blowoff charges at a low-temperature low-humidity condition (5° C., 30%) and high-temperature high-humidity condition (35° C., 90%) were −28.1 μC/g and −27.0 μC/g, respectively, which indicated high stability.

When the developer was used for a commercial selenium drum by the magnetic brush developing process, fog-free sharp black toner images were obtained with high thin-line reproducibility. The developer was used for making 50,000 copies continually, but the toner images thereafter produced were found to be free of degradation in quality.

EXAMPLE 2

| | |
|---|---|
| Polyester resin (product of Nippon Synthetic Chemical Co., Ltd.) | 100 parts |
| Blue dye (Valifast Blue #2606, product of Orient Chemical Industries Ltd.) | 5 parts |
| Compound Example (2) | 1.5 parts |

The above ingredients were treated in the same manner as in Example 1 to prepare a blue toner, and a developer was obtained similarly using the toner.

The developer was −22.7 μC/g in the amount of initial blowoff charges. The amounts of blowoff charges at a low-temperature low-humidity condition (5° C., 90%) were −22.1 μC/g and −20.9 μC/g, respectively. This indicates high stability. When used in the same manner as in Example 1, the developer produced distinct blue toner images free from any fog. The developer was used for making 50,000 copies continually, but the toner images thereafter produced were found to be free of degradation in quality.

EXAMPLE 3

| | |
|---|---|
| Styrene-acryl copolymer (HIMER SMB600, product of Sanyo Kasei Co., Ltd.) | 100 parts |
| Red dye (Valifast Red #1306, product of Orient Chemical Industries Ltd.) | 7 parts |
| Compound Example (5) | 1 part |

The above ingredients were treated in the same manner as in Example 1 to prepare a red toner, and a developer was obtained similarly using the toner.

The developer was −35.4 μC/g in the amount of initial blowoff charges. The amounts of blowoff charges at a low-temperature low-humidity condition (5° C., 30%) and high-temperature high-humidity condition (pb 35° C., 90%) were −36.7 μC/g and −34.8 μC/g, respectively. This indicates high stability. When used in the same manner as in Example 1, the developer gave distinct red toner images free from any fog and with high thin-line reproducibility. The developer was used for making 50,000 copies continually, but the toner images thereafter produced were found to be free of degradation in quality.

EXAMPLE 4

| | |
|---|---|
| Styrene-n-butyl methacrylate copolymer resin (65/35) | 100 parts |
| Benzidine Yellow (C.I. Pigment Yellow 12) | 4 parts |

-continued

| | |
|---|---|
| Compound Example (3) | 1 part |

The above ingredients were treated in the same manner as in Example 1 to prepare a yellow toner, and a developer was obtained similarly using the toner.

The developer was −31.6 μC/g in the amount of initial blowoff charges. The amounts of blowoff charges at a low-temperature low-humidity condition (5° C., 30%) and high-temperature high-humidity condition (35° C., 90%) were −32.1 μC/g and −30.5 μC/g, respectively. This indicates high stability. When used in the same manner as in Example 1, the developer produced distinct yellow toner images free from any fog. The developer was used for making 50,000 copies continually, but the toner images thereafter produced were found to be free of degradation in quality.

EXAMPLE 5

| | |
|---|---|
| Styrene-2-ethylhexyl methacrylate copolymer resin (80/20) | 100 parts |
| Tri-iron tetroxide (EPT-500) | 50 parts |
| Low-grade polymerized polypropylene (Biscal 550P, product of Sanyo Kasei co., Ltd.) | 4 part |
| Compound Example (4) | 2 part |

The above ingredients were uniformly premixed by a ball mill to obtain a premix, which was then kneaded in a molten state at 180° C. using a twin-screw extruder (PCM-30, product of Ikegai Seisakusho Co., Ltd.), cooled and thereafter roughly crushed, pulverized and classified, giving a toner ranging from 5 to 15 μm in particle size. Two parts of the toner were admixed with 98 parts of a particulate iron carrier (TEFV 200/300, product of Nippon Teppun Co., Ltd.) to obtain a developer, which was found to be −22.9 μC/g in the amount of blowoff charges.

When the developer was used for a commercial copying machime (Canon NP201, product of Canon Inc.), fog-free distinct toner images were obtained with good thin-line reproducibility and a reflection density of 1.4 at the solid image area.

When the aromatic o-aminocarboxylic acid and aluminum are 2:1 in mole ratio, the product will be represented by the following formula [IV] or the formula [V].

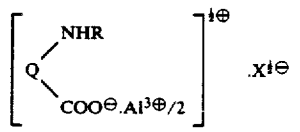
(IV)

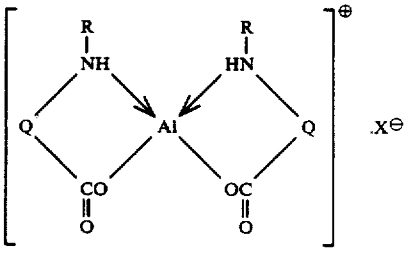
(V)

wherein Q is benzene nucleus which is optionally substituted with at least one nuclear substituent or naphthalene nucleus which is optionally substituted with at least one nuclear substituent, R is hydrogen, alkyl ($C_1$–$C_{18}$), aryl($C_1$–$C_{18}$), aralkyl($C_1$–$C_{18}$), or —COR', wherein R' is alkyl($C_1$–$C_8$), aryl($C_1$–$C_8$), alkoxy ($C_1$–$C_8$) or amino, X is counter ion.

PREPARATION EXAMPLE 4

Preparation of aluminum compound of N-methylanthranilic acid (N-methylanthranilic acid and aluminum are 2:1 in mole ratio)

At 30.2 g (0.2 mole) quantity N-methylanthranilic acid and a 10.6 g (0.1 mole) quantity of sodium carbonate were added to a 300 ml of DMF, and they were completely dissolved. A solution of 24.1 g (0.1 mole) of $AlCl_3.6H_2O$ in 100 ml of DMF was slowly added dropwise to the acid and sodium carbonate solution. The mixture was thereafter stirred at about 130° C. for an hour, then cooled to about 20° C. The cooled reaction mixture was filtered, and the resulting product was washed with water until the pH of the washings was adjusted to neutrality. The washed product was dried at 90° C., giving about 29 g of a white powder (compound example (12) given below).

| Compound Example | No. |
|---|---|
| 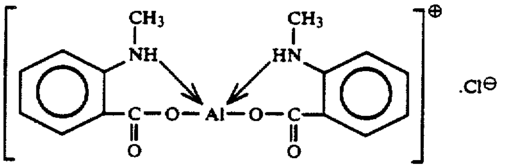 | (12) |
| 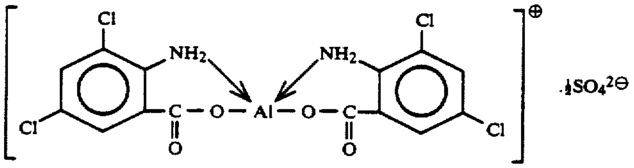 | (13) |

EXAMPLE 6

| | | |
|---|---|---|
| Polyester resin (product of Nippon Synthetic Chemical Co., Ltd.) | 100 | parts |
| Carbon black (product of Mitsubishi Chemicals, Ltd.) | 7 | parts |
| Compound Example (12) | 1 | part |

The above ingredients were premixed uniformly by a high-speed mixer. The premix was then kneaded in a molten state by an extruder, cooled and thereafter roughly divided by a vibrating mill. The resulting mixture was pulverized by an air jet mill equipped with a classifier, giving a black toner 10 to 20 μm in particle size.

A developer was prepared by admixing 95 parts of a particulate iron carrier (TEFV 200/300, product of Nippon Teppun Co., Ltd.) with 5 parts of the toner. The developer was −22.8 μC/g in the amount of initial blowoff charges. The amounts of blowoff charges at a low-temperature low-humidity condition (5° C., 30%) and high-temperature high-humidity condition (35° C., 90%) were −23.0 μC/g and −22.3 μC/g, respectively, which indicated high stability.

When the developer was used for a commercial selenium drum by the magnetic brush developing process, fog-free sharp black toner images were obtained with high thin-line reproducibility. The developer was used for making 50,000 copies continually, but the toner images thereafter produced were found to be free of degradation in quality.

What is claimed is:

1. An aluminum compound of aromatic o-aminocarboxylic acid, the aromatic o-aminocarboxylic acid being represented by the formula

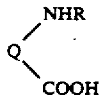 [I]

wherein Q is a benzene nucleus which is optionally substituted with at least one nuclear substituent or napthalene nucleus which is optionally substituted with at least one nuclear substituent, R is hydrogen, alkyl ($C_1$–$C_{18}$), aryl or nuclear substituted aryl ($C_6$–$C_{18}$), aralkyl or nuclear substituted aralkyl ($C_7$–$C_{18}$), or —COR', wherein R' is alkyl ($C_1$–$C_8$), aryl ($C_6$–$C_8$), alkoxy ($C_1$–$C_8$) or amino.

2. Compound of claim 1, wherein the aluminum compound is a complex compound of aluminum and said aromatic o-aminocarboxylic acid.

3. Compound of claim 2, wherein the complex compound is in the form of a complex with a counter ion.

4. Compound of claim 1, wherein the aluminum compound is an aluminum salt of said aromatic o-aminocarboxylic acid.

5. Compound of claim 1, wherein the aluminum compound is an aluminum compound of aromatic o-aminocarboxylic acid selected from the group consisting of anthranilic acid, 5-methylanthranilic acid, 4-t-butylanthranilic acid, 5-ethoxyanthranilic acid, 6-acetaminoanthranilic acid, 4-chloroanthranilic acid, 3,5 dichloroanthranilic acid, N-methylanthranilic acid, N-acetanylanthranilic acid, N-phenylanthranilic acid, N-benzylanthranilic acid, N-carbomethoxyanthranilic acid, N-benzoyl-5-bromoanthranilic acid, 4-chloro-2-anilinobenzoic acid, 2-ureidobenzoic acid, 3-amino-2-napthoic acid, 4,4'-diaminodiphenyl-3-carboxylic acid, 2',3'-dimethyldiphenylamine-carboxylic acid, 2', 5'-dichlorodiphenylamine-caroxylic acid, and mixtues thereof.

6. Compound of claim 1, wherein R is hydrogen.

7. Compound of claim 1, wherein R is alkyl ($C_1$–$C_{18}$).

8. Compound of claim 1, wherein R is aryl or nuclear substituted aryl ($C_6$–$C_{18}$).

9. Compound of claim 8 wherein R is phenyl.

10. Compound of claim 8 wherein R is phenyl which is substituted with methyl or chloro.

11. Compound of claim 1 wherein R is aralkyl or nuclear substituted aralkyl ($C_7$–$C_{18}$).

12. Compound of claim 1 wherein R is benzyl.

13. Compound of claim 1 wherein R is —COR'.

14. Compound of claim 13 wherein R' is alkyl ($C_1$–$C_8$).

15. Compound of claim 13 wherein R' is aryl ($C_6$–$C_8$).

16. Compound of claim 15 wherein R' is phenyl.

17. Compound of claim 13 wherein R' is amino.

18. Compound of claim 1 wherein R is hydrogen, alkyl ($C_1$–$C_{18}$) phenyl methyl substituted phenyl, chloro substituted phenyl, benzyl, or —COR', and R' is alkyl ($C_1$–$C_8$), phenyl, alkoxy ($C_1$–$C_8$) amino.

* * * * *